United States Patent [19]

Hermanson

[11] 3,952,712

[45] Apr. 27, 1976

[54] COMPOSITE FLYWHEEL ASSEMBLY

[75] Inventor: William O. Hermanson, Kiel, Wis.

[73] Assignee: Tecumseh Products Company, Tecumseh, Mich.

[22] Filed: Jan. 30, 1975

[21] Appl. No.: 545,484

[52] U.S. Cl. ............................ 123/41.65; 123/41.63; 415/197; 416/60; 416/241 A
[51] Int. Cl.² ............................................ F01P 7/04
[58] Field of Search ........... 123/41.63, 41.65, 41.66; 416/60, 241 A, 244; 310/153; 415/197

[56] References Cited
UNITED STATES PATENTS

| | | | |
|---|---|---|---|
| 1,366,776 | 1/1921 | Filippini | 416/60 |
| 2,157,666 | 5/1939 | Jacobi | 123/41.65 |
| 2,315,235 | 3/1943 | Weidner | 415/197 |
| 2,778,961 | 1/1957 | Jepson | 310/153 |
| 2,827,225 | 3/1958 | Killian | 416/60 |
| 2,932,447 | 4/1960 | Phelon | 416/60 |
| 3,071,315 | 1/1963 | Alis | 416/60 |
| 3,095,822 | 7/1963 | Kiefer | 416/241 |
| 3,183,902 | 5/1965 | Wicklund | 123/41.65 |
| 3,638,594 | 2/1972 | Armstead | 416/60 |

Primary Examiner—Charles J. Myhre
Assistant Examiner—Daniel J. O'Connor
Attorney, Agent, or Firm—Barnes, Kisselle, Raisch & Choate

[57] ABSTRACT

A composite flywheel assembly for an air-cooled internal combustion engine including a cast iron flywheel which provides the inertial drive for the engine and a separate blower member having a circumferential array of vanes for propelling a flow of cooling air past cooling fins of the engine. The blower member is a one-piece molded impeller of flexible plastic material and is releasably retained on the inertia wheel by a snap-on interlocking engagement about the outer periphery of the flywheel. The closed end of a starter cup is received over an engine crankshaft and engages a conical skirt extending inwardly from the impeller base to spring bias the impeller against the flywheel.

7 Claims, 6 Drawing Figures

COMPOSITE FLYWHEEL ASSEMBLY

This invention relates to internal combustion engines and, more particularly, to flywheels for low horsepower, air-cooled internal combustion engines such as those used on recreational vehicles, pumps, riding lawnmowers and other engine-powered lawn and garden appliances.

Objects of this invention are to provide a composite metal and plastic flywheel assembly for an air-cooled internal combustion engine in which there is little likelihood of the impeller vanes being damaged, in which the impeller may be easily and economically replaced if the vanes become damaged, in which the likelihood of the impeller vanes causing bodily injury if they become separated from the flywheel during use thereof is decreased, and which is particularly suited for economical manufacture using mass production techniques.

These and other objects, features and advantages of this invention will be apparent from the following description, appended claims and accompanying drawngs in which:

Figure 1:
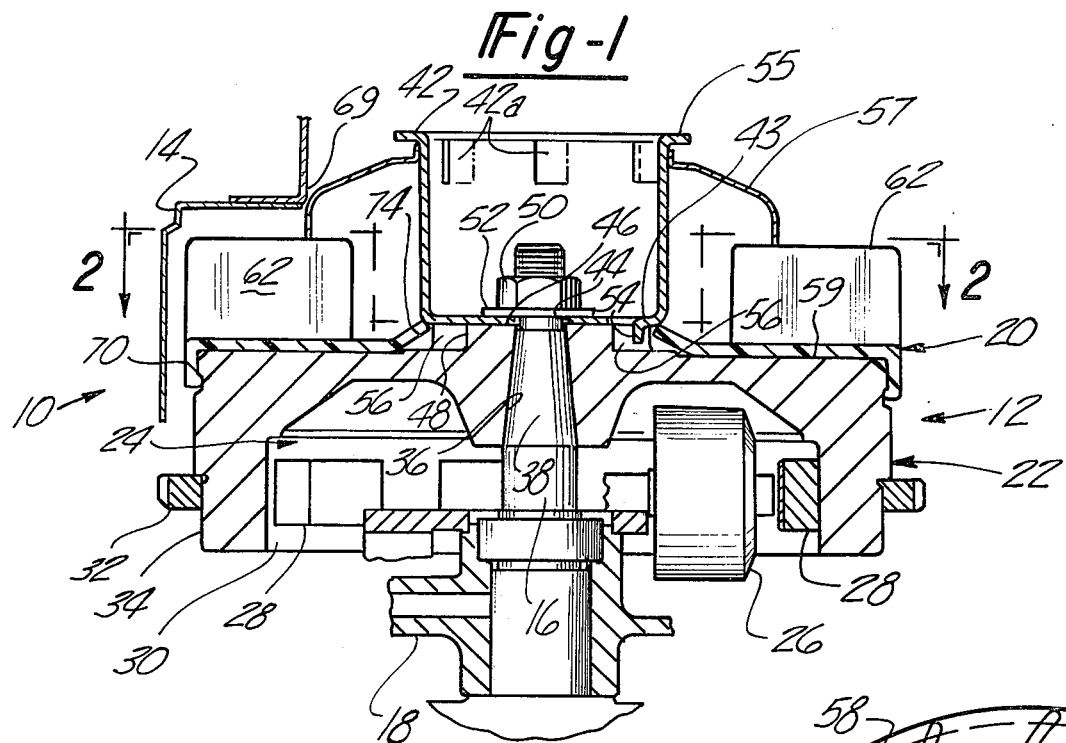
FIG. 1 is a fragmentary vertical sectional view taken on line 1—1 of FIG. 2 of an air-cooled, vertical shaft internal combustion engine equipped with a presently preferred embodiment of the composite flywheel assembly provided in accordance with the present invention.
Figure 5:
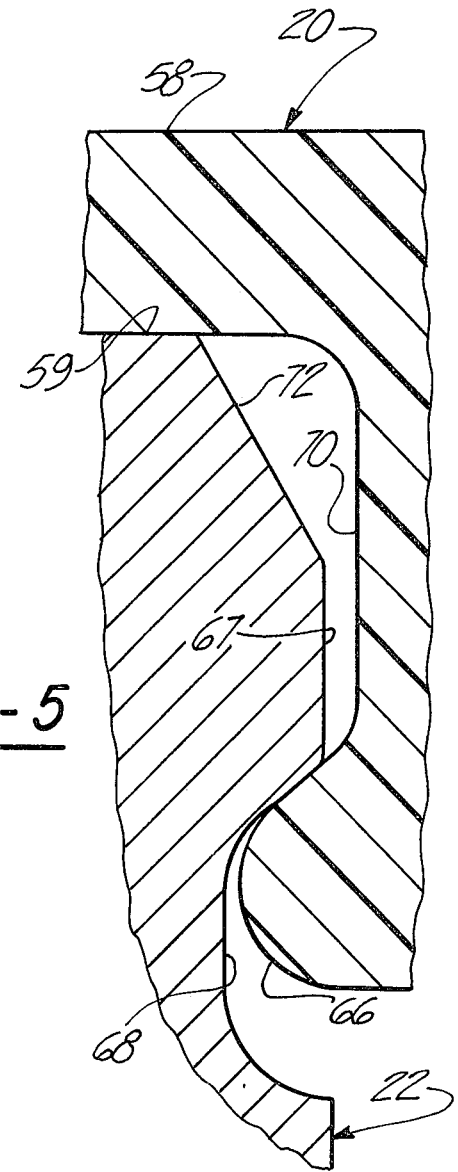
Figure 6:
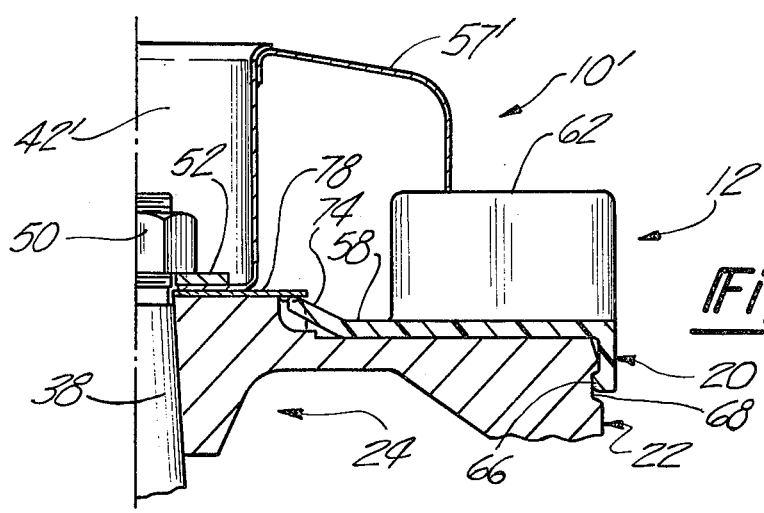

FIG. 5 is another enlarged fragmentary view of the composite flywheel of the engine of FIG. 1 illustrating the structure retaining the outer periphery of the impeller on the inertia flywheel; and FIG. 6 is a fragmentary vertical sectional view of another air-cooled, vertical shaft internal combustion engine adapted for use with an electric starter and equipped with a composite flywheel embodying the present invention.

Referring in more detail to the drawings, a portion of a conventional air-cooled internal combustion engine 10 equipped with a composite metal and plastic flywheel assembly 12 embodying the present invention is illustrated, particularly in FIG. 1. Flywheel 12 is received in a fan or blower housing 14 and mounted for rotation therein on a crankshaft 16 journalled in a crankcase 18 of engine 10. Pursuant to the present invention flywheel assembly 12 is constructed as a composite of two separate parts: a cast iron inertia flywheel 22 and a molded plastic blower member or impeller 20 removably mounted on wheel 22 for rotation therewith. Current for the ignition system of engine 10 is produced by an alternator having a stator assembly 26 fixed to crankcase 18 and cooperating with a plurality of circumferentially spaced ceramic magnet assemblies 28 carried within an axially facing pocket 24 of inertia wheel 22. Magnet assemblies 28 are circumferentially spaced on and bonded to a cylindrical side wall surface 30 of pocket 24. A ring gear 32 is pressed or shrunk onto an outer peripheral shoulder 34 of inertia wheel 22 for cooperation with an electric starter to crank engine 10 for starting. If engine 10 does not have an electric starter, ring gear 32, which is not part of the present invention, may be omitted.

Figure 2:
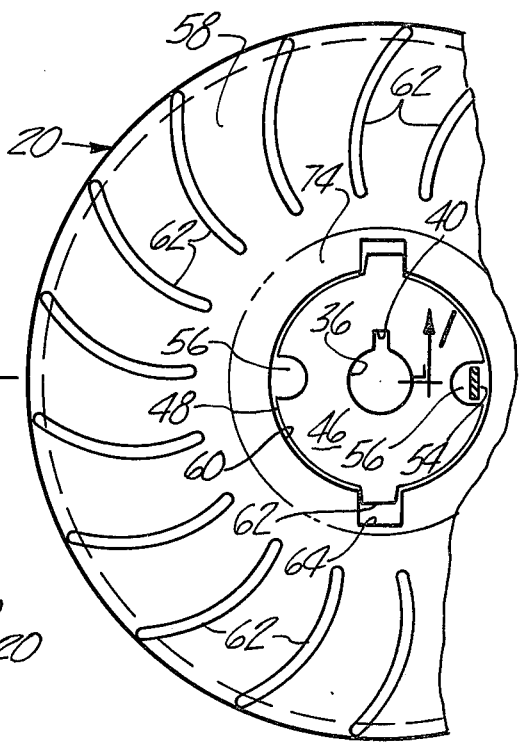
FIG. 2 is a fragmentary top view of the composite flywheel assembly shown in FIG. 1, taken along the line 2—2 of FIG. 1.

Inertia wheel 22 has a centrally located tapered bore 36 received over a mating tapered portion 38 of crankshaft 16, and is connected to the crankshaft for rotation therewith by means of a key (not shown) received in a key way 40 in the flywheel (FIG. 2) and in a corresponding key way in shaft 16. A cup-shaped starter hub 42 having a closed end 43 with a centrally located hole 44 is received over crankshaft 16 to bear against an axially facing flat surface 46 of a cylindrical boss 48 extending upwardly from the upper axially facing surface 59 of inertia wheel 22. Starter hub 42 and inertia wheel 22 are axially secured to crankshaft 16 by a nut 50 and a lock washer 52. The hub is restrained from rotation relative to the inertia wheel by a depending tub 54 extending into one of a pair of diametrically opposed pockets 56 in boss 48. A cup-shaped guard screen 57 is welded to the open rim 55 of starter hub 42 and opens downwardly toward the flywheel. A plurality of dogs 42a are formed in rim 55 and are adapted to engage a recoil starter mechanism (not shown) for manually cranking engine 10.

Impeller 20 includes a flat base or disk 58 which rests upon upper surface 59 of flywheel 22 and has a plurality of vanes 62 circumferentially disposed about the base and extending generally axially and radially therefrom. A flange 70 extends axially from base 58 around its outer periphery and terminates in a radially inwardly protruding rib or tongue 66 at its free edge. Tongue 66 is received in snap-fit engagement in a corresponding radially outwardly facing groove 68 in the outer periphery 67 of the flywheel. The free-state diameter of tongue 66 is slightly less than that of groove 68 so that, under normal thermal conditions, i.e., when impeller 20 is not expanded by engine heat, the impeller is frictionally restrained against rotation with respect to the flywheel by the peripheral tongue-in-groove connection 66,68. Preferably, impeller 20 is molded as a one-piece member of a slightly resilient plastic material such as polypropylene plastic. The inherent resiliency of the plastic material yieldably biases rib 66 of the impeller into firm engagement with groove 68.

As best seen in FIG. 5 the flywheel surface 59 flares into flywheel periphery 67 along a conical surface 72 having a diameter at surface 59 which is less than the free-state diameter of tongue 66. When impeller 20 is pressed onto flywheel 22, the diameter of tongue 66 is gradually expanded to the diameter of periphery 67 as tongue 66 rides along surface 72. Tongue 66 will then ride along periphery 67 until it snaps into groove 68, thereby pulling base 58 snugly against flywheel surface 59. A pair of diametrically opposed dogs 62 extend radially outwardly from boss 46 along surface 59 and are received in a pair of grooves 64 in the periphery of a centrally located, boss-receiving opening 60 in impeller base 58. Should thermal expansion of impeller 20 cause loss of frictional contact at the tongue-in-groove engagement 66,68, notches-in-groove 62,64 restrain impeller 20 for rotation with respect to flywheel 22.

Figure 3:
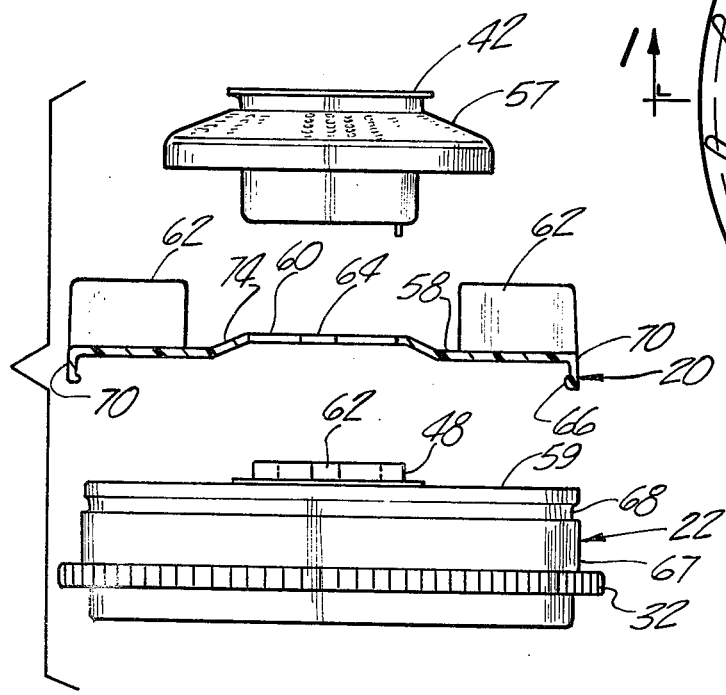
FIG. 3 is an exploded elevational view of the starter hub, guard screen and composite flywheel assembly shown in FIG. 1.
Figure 4:
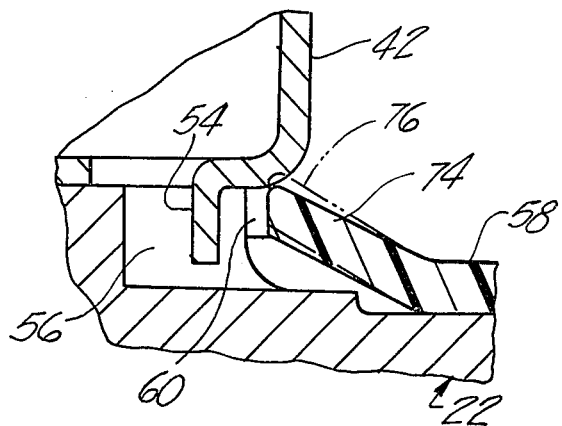
FIG. 4 is an enlarged fragmentary vertical sectional view of the composite flywheel and hub parts of the engine of FIG. 1 illustrating the structure retaining the central portion of the impeller on the inertia flywheel.

As best seen in FIGS. 1, 3 and 4, base 58 of impeller 20 terminates adjacent center hole 60 in an upwardly flared skirt 74, the tip of which, in assembly, underlies the bottom of starter hub 42 to spring bias the central portion of disk 58 onto inertia wheel 22. Thus, as shown in FIG. 4, flared portion 74 of disk 58 is preferably flexed in assembly by hub 42 from its normal unloaded or free-state position, indicated in phantom at 76, toward the flywheel to thereby yieldably urge the central portion of the disk into firm engagement with the upper face of inertia wheel 22. It has been found that, without thus biasing of base 58 firmly against flywheel surface 59 centrally of vanes 62, the centrifugal forces acting on the center of gravity of impeller 20 develops a moment tending to lift base 58 off of the flywheel, allowing dust and dirt, etc., to enter via opening 60 and wedge underneath the base. An accumulation of such dirt may wedge impeller 20 away from flywheel 22 sufficiently to cause vanes 62 to strike blower housing 14.

It is also preferred that the open rim of guard screen 57 abut the axial tips of vanes 62 such that screen 57 is spring biased slightly upwardly. In this way rattling caused by vibration of screen 57 is prevented. It will be noted with respect to FIG. 1 that screen 57 is biased into close proximity with the edge 69 of the opening in the blower housing surrounding cup 42. In this way, leakage of dirt between the screen and housing is greatly reduced.

FIG. 6 shows a modified engine 10' with a composite flywheel assembly 12 embodying the present invention. Engine 10' is the same as engine 10 except that it has an electric starter (not shown) and a modified hub 42' and blower screen 57'. Modified hub 42' has a smaller diameter than hub 42 and blower screen 57' has a slightly different cross section than blower screen 57. Due to the smaller diameter of hub 42' a flat washer 78 is inserted between hub 42' and flywheel 22 to bear on the tip of flared skirt 74 of base 58, and to urge the disk into firm engagement with the upper face of the inertia wheel. Engine 10' does not have a recoil starter, and hence, cup 42' merely serves to support blower screen 57'.

Due to the nature of the composite flywheel assembly embodying the present invention, i.e., a metallic inertia flywheel with a separate plastic impeller mounted thereon, the assembly is economical to manufacture, and is particularly well suited for high-volume mass production and assembly techniques. The bevel 72 and flexible, resilient flange 70 cooperate to permit rapid press-on assembly of impeller 20 onto flywheel 22 even with relatively loose axial alignment tolerances in an automatic assembly fixture. The inertia wheel can be readily and economically cast and machined of a high density metal since there are no cooling fins cast thereon. Cast iron may be used to provide a high-strength flywheel which is less likely to disintegrate in use than is a similar flywheel constructed of lower strength metals, such as aluminum or zinc. Likewise, the blower member can be readily and economically injection molded of a low density, slightly resilient plastic material, such as polypropylene, as a one-piece structure with homogeneously integral vanes. Making the vanes of a slightly resilient plastic material decreases the likelihood of damage to the vanes during assembly of the composite flywheel and during installation thereof onto an engine. Moreover, if the vanes of the composite flywheel are damaged, the flywheel may be readily and economically repaired by merely replacing the blower member without also having to discard the more costly inertia wheel. Furthermore, the likelihood of bodily injury due to separation of one of the vanes from the composite flywheel during use is decreased because of the substantially reduced mass of the plastic vane as compared to a metallic vane.

From the foregoing description it will now be evident that the composite flywheel assembly provided in accordance with the present invention fully satisfies the objects, aims and advantages set forth above. While the invention has been described in conjunction with a specific embodiment thereof, it will be apparent that many alternatives, modifications and variations will suggest themselves to persons skilled in the art in view of the foregoing description. It is intended that the present invention embrace all such alternatives, modifications and variations as fall within the spirit and broad scope of the appended claims.

The invention claimed is:

1. A composite flywheel assembly for an air-cooled internal combustion engine comprising a metallic flywheel having a flat axially facing surface and a peripheral surface with a continuous radially facing groove, an impeller integrally molded of resilient material having a base which rests upon said axially facing flywheel surface, a circumferential array of axially extending blower vanes and an axially extending flange depending from said impeller base about said peripheral surface with a radially inwardly protruding tongue at the free edge of said flange, said tongue having a free-state diameter which is less than the diameter of said groove and being received in snap-fit engagement in said groove, and means centrally urging said impeller base against said axially facing flywheel surface.

2. A composite flywheel assembly for an air-cooled internal combustion engine comprising a metallic flywheel having a flat axially facing surface and a peripheral surface with a continuous radially facing groove, and an impeller integrally molded of resilient plastic material having a base which rests upon said axially facing flywheel surface, a circumferential array of axially extending blower vanes and an axially extending flange depending from said impeller base about said peripheral surface with a radially inwardly protruding tongue at the free edge of said flange, said tongue having a free-state diameter which is less than the diameter of said groove and being received in snap-fit engagement in said groove, said axially facing flywheel surface flaring into said peripheral surface along a conical surface having a diameter at said axially facing surface which is less than said free-state diameter, whereby the diameter of said tongue is gradually expanded to match the diameter of said peripheral surface as said impeller is pressed onto said flywheel.

3. A composite flywheel assembly for an air-cooled internal combustion engine comprising a metallic flywheel having a flat axially facing surface and a peripheral surface with a continuous radially facing groove, and an impeller integrally molded of resilient plastic material having a base which rests upon said axially facing flywheel surface, a circumferential array of axially extending blower vanes and an axially extending flange depending from said impeller base about said peripheral surface with a radially inwardly protruding tongue at the free edge of said flange, said tongue having a free-state diameter which is less than the diameter of said groove and being received in snap-fit engagement in said groove, said flywheel having a centrally located boss axially extending from said axially facing surface with at least one dog extending radially from the periphery of said boss along said surface, said impeller base having a centrally located opening received over said boss periphery, the periphery of said opening having a radially facing groove which receives said dog.

4. The composite flywheel assembly set forth in claim 3 wherein said boss has two dogs oppositely extending from said boss periphery, and wherein said opening periphery has diametrically opposed grooves receiving said dogs.

5. The composite flywheel assembly set forth in claim 1 wherein said engine has a vertical crankshaft extending axially through a central opening in said flywheel, and cup-shaped starter means having a closed end received over said shaft; wherein said flywheel has a centrally located boss on said axially facing surface, said closed end of said cup-shaped starter means resting on an axially facing surface of said boss; and wherein said means centrally urging said impeller base against said flywheel surface comprises a centrally located opening in said impeller base received over said boss, the periphery of said base opening including a spring-skirt extending radially inwardly and axially upwardly from said impeller base, said closed end of said starter means abutting an inner edge of said skirt and spring-biasing said skirt and base downwardly onto said flywheel.

6. The composite flywheel assembly set forth in claim 5 wherein a cup-shaped guard screen is affixed to the open end of said cup-shaped starter means to open downwardly toward said flywheel, the open periphery of said guard screen being held in spring biased engagement with the axial tips of said vanes.

7. The composite flywheel assembly set forth in claim 1 wherein said impeller base has a centrally located opening, the periphery of said opening including a spring-skirt extending radially inwardly and axially upwardly from said impeller base, said means urging said base against said flywheeel surface abutting an inner edge of said skirt and spring-biasing said skirt and base downwardly against said flywheel surface.

* * * * *